No. 885,881. PATENTED APR. 28, 1908.
W. J. STECKEL.
FEED REGULATOR FOR CORN SHELLERS.
APPLICATION FILED MAY 28, 1906.

Witnesses:
Wm. Geiger
H. W. Munday

Inventor:
William J. Steckel
By Munday, Evarts & Adcock
Attorneys

UNITED STATES PATENT OFFICE.

WILLIAM J. STECKEL, OF JOLIET, ILLINOIS, ASSIGNOR TO JOLIET MANUFACTURING COMPANY, OF JOLIET, ILLINOIS, A CORPORATION OF ILLINOIS.

FEED-REGULATOR FOR CORN-SHELLERS.

No. 885,881.     Specification of Letters Patent.     Patented April 28, 1908.

Application filed May 28, 1906. Serial No. 318,984.

*To all whom it may concern:*

Be it known that I, WILLIAM J. STECKEL, a citizen of the United States, residing in Joliet, in the county of Will and State of Illinois, have invented a new and useful Improvement in Feed-Regulators for Corn-Shellers, of which the following is a specification.

This invention relates to improvements in the feeders of corn shellers, designed to insure the entrance of the ears endwise into the corn sheller in a uniform and orderly manner. To accomplish this object I place moving devices which may appropriately be termed regulators, between the carrying or elevating chains of the feeders, such regulators being adapted to turn such of the ears as may be moving sidewise toward the sheller to the endwise position before they have passed off the chains. These regulators are preferably located near the top of the feeder, but they may be located at the bottom or at any other desired point upon the feeder, or they may be duplicated one at the upper and one at the lower end of the feeder.

Figure 1:
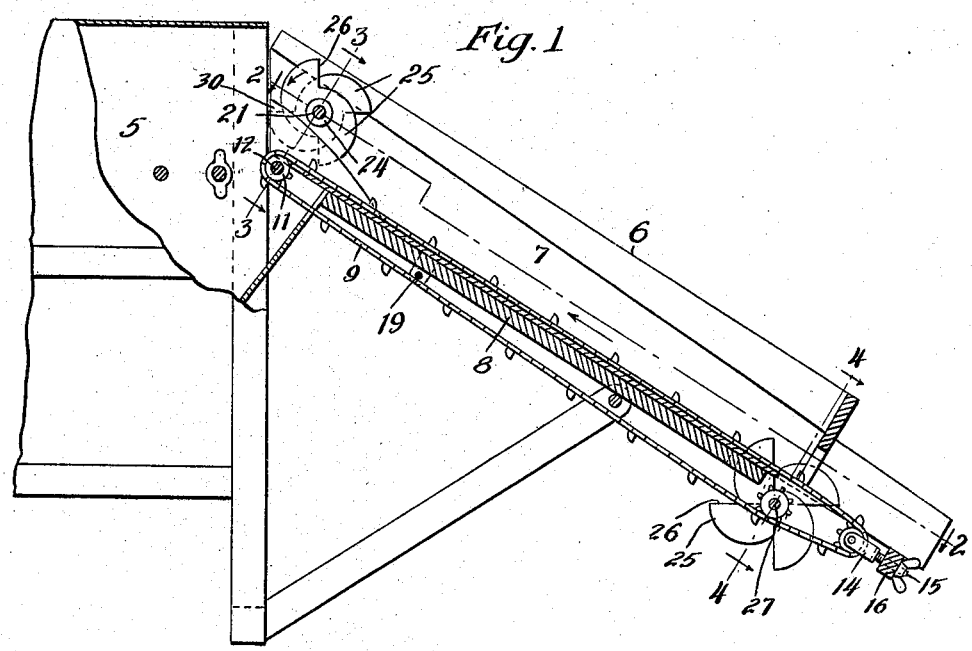
Figure 2:
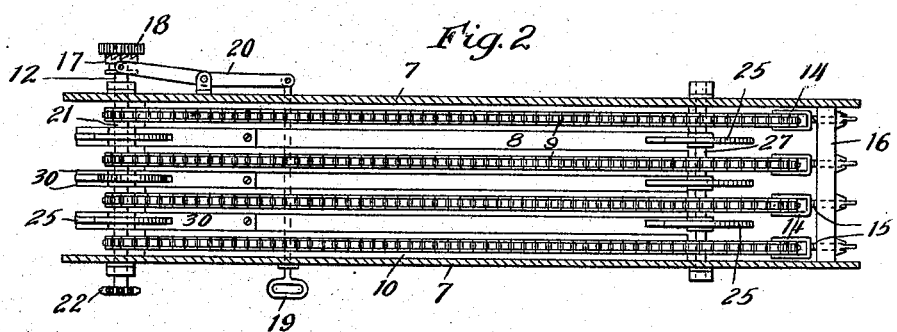
Figure 3:
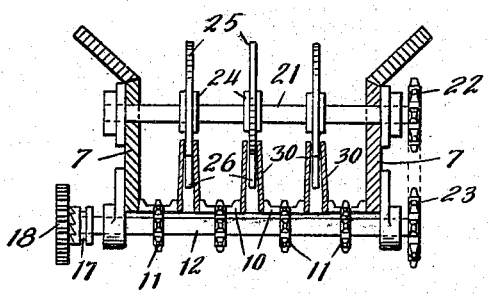
Figure 4:
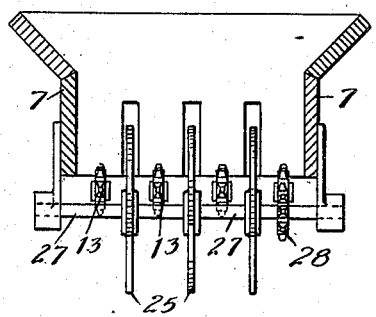

The nature of my improvement is fully disclosed herein and illustrated in the accompanying drawing in which Figure 1 is a longitudinal vertical section of a corn sheller feeder embodying my invention showing a partial section of the sheller. Figs. 2, 3 and 4 are sections on the lines 2—2, 3—3 and 4—4 respectively of Fig. 1.

In said drawing, 5 represents the corn sheller, and 6 the feeder thereof. As is customary, the latter is a trough like structure having sides 7, 7, the floor being shown at 8, the carrying chains at 9, 9 and the ways under the chains at 10, 10. The chains pass over sprocket wheels 11 on shaft 12 at the upper end of the feeder and over independent wheels 13, at the lower end of the feeder, the wheels being pivotally supported in yokes 14 mounted on adjusting screws 15 passing through a cross bar 16. The shaft 12 is driven by the clutch 17 actuated by a gear 18, the latter being connected to the sheller and driven by power therefrom in some suitable way. The clutch is opened and closed by the rod 19, operable by hand, and the lever 20 pivoted centrally and connected at one end to the shifting member of the clutch and to said rod at the other end.

Across the upper end of the feeder and sufficiently elevated to avoid interference with the corn is a transverse shaft 21, provided with a sprocket 22 adapted to take power from the sprocket 23 on shaft 12. Upon this shaft 21 are mounted the regulators, which regulate the position of the ears as they approach the sheller, turning any which may be coming sidewise to the proper endwise position. These regulators have hubs 24 upon which are cam shaped wings or projections 25 flat upon their sides and with their outer edges curved or gradually increasing in diameter and terminating in an abrupt shoulder 26 at the point of greatest diameter, two of the wings being preferably cast upon each hub.

At each side of each regulator are vertical plates 30 acting as guides and extending up into proximity to the regulator shaft. The cam or curved edges of the regulator encounter all such ears of corn as may be standing crosswise of the chain as they approach the sheller and assisted by the guide plates deflect and turn them so that they fall onto the chains, and are thus righted in position before they enter the sheller.

The regulators may be placed at any point desired upon the feeder, but I prefer to locate them at the upper end as in that way I insure the proper position of the ears at the moment they are carried into the sheller. I may also duplicate the regulators at the lower end of the feeder, and illustrate that construction in the drawing. These lower regulators are mounted upon a shaft 27, receiving power from one of the elevating chains through a sprocket 28 so located as to mesh with the chain. The shaft of the lower regulators is placed below the path of the corn and the wings project upward into the path, as plainly shown. No guide plates are necessary with the lower regulators.

All the regulators are located in planes between the elevating chains as plainly shown, so that they do not touch or disturb such of the ears as may be properly positioned parallel with the chains.

I claim:—

1. The corn sheller feeder consisting of a trough and a plurality of independent elevating chains moving longitudinally of said trough, in combination with a transverse rotating shaft arranged on the trough and elevated above the path of the corn, projections mounted on said shaft in planes between each pair of chains, and adapted to straighten crosswise ears, such projections having curved outer edges of gradually increasing diameter, and means for actuating the shaft in a direction contrary to the feed.

2. The corn sheller feeder consisting of a trough and a plurality of independent elevating chains moving longitudinally of said trough, in combination with a transverse rotating shaft arranged on the trough and elevated above the path of the corn, regulating wings or devices mounted on the shaft in planes between each pair of chains and adapted to reach and straighten crosswise ears, means for operating said shaft in a direction contrary to the feed, and stationary guide plates at each side of each regulating device, such guide plates extending upward above the plane of the path of the regulating devices.

WILLIAM J. STECKEL.

Witnesses:
L. S. WHITMORE,
F. W. MOHLER.